United States Patent
Lamb et al.

(10) Patent No.: US 6,772,958 B1
(45) Date of Patent: Aug. 10, 2004

(54) THERMAL FLOW CONTROL VALVE

(75) Inventors: Kevin W. Lamb, Glastonbury, CT (US); David Piscitelli, Wallingford, CT (US); Kenneth Lionello III, Waterbury, CT (US)

(73) Assignee: Rostra Precision Controls, Inc., Laurinburg, NC (US)

( * ) Notice: Subject to any disclaimer, the term of this patent is extended or adjusted under 35 U.S.C. 154(b) by 0 days.

(21) Appl. No.: 10/424,437

(22) Filed: Apr. 28, 2003

(51) Int. Cl.[7] ................................................. F01P 7/16
(52) U.S. Cl. ..................................... 236/34.5; 236/100
(58) Field of Search ........................ 236/12.2, 34, 34.5, 236/93 R, 93 A, 99 K, 100

(56) References Cited

U.S. PATENT DOCUMENTS

| | | | |
|---|---|---|---|
| 3,818,981 A | 6/1974 | Caldwell | 165/35 |
| 3,907,199 A * | 9/1975 | Kreger | 237/12.3 B |
| 3,946,943 A | 3/1976 | Hattori | 236/34.5 |
| 4,024,909 A | 5/1977 | Hofmann, Jr. | 165/35 |
| 4,186,872 A | 2/1980 | Bland, Jr. et al. | 236/34.5 |
| 4,190,198 A | 2/1980 | Casuga et al. | 236/34.5 |
| 4,260,011 A | 4/1981 | Brown | 165/35 |
| 4,386,650 A | 6/1983 | Moen | 165/12 |
| 4,416,194 A | 11/1983 | Kemp | 99/275 |
| 4,460,007 A | 7/1984 | Pirkle | 137/79 |
| 4,537,346 A * | 8/1985 | Duprez | 236/34.5 |
| 4,669,532 A | 6/1987 | Tejima et al. | 165/36 |
| 4,907,739 A | 3/1990 | Drake | 237/8 C |
| 4,964,376 A | 10/1990 | Veach et al. | 123/557 |
| 5,018,664 A * | 5/1991 | Butler | 236/34.5 |
| 5,676,308 A | 10/1997 | Saur | 236/34.5 |
| 5,974,827 A * | 11/1999 | Hosking et al. | 62/468 |
| 6,109,346 A | 8/2000 | Hill | 165/297 |
| 6,253,837 B1 | 7/2001 | Seiler et al. | 165/103 |
| 6,343,746 B2 * | 2/2002 | Chamot et al. | 236/34.5 |
| 6,575,707 B2 * | 6/2003 | Matt et al. | 417/228 |

* cited by examiner

Primary Examiner—William E. Tapolcai
(74) Attorney, Agent, or Firm—Alix, Yale & Ristas, LLP (57) ABSTRACT

A thermal flow control valve uses a cylindrical valve sleeve in a stepped bore to regulate fluid flow between an inlet and an outlet. A wax filled actuator is coupled to the valve sleeve to move the sleeve from an open position in which radial flow openings in the sleeve communicate with a larger diameter portion of the stepped bore to a closed position in which the radial flow openings are closed by a sleeve chamber closely surrounding the sleeve. A flow-through end cap closes one end of the stepped bore and provides an axially aligned fixed stop for the actuator piston. Two-way, three-way and mixing embodiments of the valve are disclosed.

20 Claims, 6 Drawing Sheets

THERMAL FLOW CONTROL VALVE

BACKGROUND OF THE INVENTION

1. Field of the Invention

The invention relates generally to thermally responsive valves and more specifically to a novel thermally activated sleeve valve.

2. Description of the Related Art

Valves that open and close in response to changes in temperature are well known. Typical examples include valves in automotive coolant systems, which open at a predetermined temperature to allow coolant to flow to cooling devices such as radiators. The typical automotive thermostat remains closed until a predetermined temperature and then opens to provide a fluid flow path to the radiator. This form of valve is open or closed and is commonly referred to as a two-way valve. An alternative configuration for a thermostatically controlled valve is that of a diverter, or three-way valve. In a diverter valve, a valve member in a first or "cold" position allows fluid to flow in a first path through the valve. When the fluid reaches a predetermined temperature, the valve actuates to divert fluid flow to a second or "hot" path through the valve. A three-way thermally activated valve typically includes a fluid inlet, a "cold" flow position outlet and a "hot" flow position outlet. When a diverter valve is activated to the "hot", or divert position, the "cold" flow path is closed. A thermally activated mixing valve has a similar overall configuration to the diverter valve, with the exception that there are "hot" and "cold" inlets and the valve member is arranged to vary the proportions of fluid from these inlets through the valve to a "mixed" temperature controlled outlet.

In a typical sleeve valve arrangement is one in which the valve sleeve reciprocates in a cylindrical valve chamber to cover and uncover ports communicating with the valve chamber at right angles to the valve chamber axis. An inlet or outlet may be in axial alignment with the cylindrical valve chamber. The temperature sensitive actuator and its associated biasing springs and/or adjustment mechanism typically close one end of the valve chamber. Because the actuator and associated hardware block one end of the valve chamber, typical thermally activated valves do not have a fluid flow path aligned with the valve chamber in any position of the valve member.

SUMMARY OF THE INVENTION

The Invention is directed to a no leak thermally actuated valve adapted to provide an axial cold flow path through a substantially cylindrical valve chamber between an inlet and a co-axial outlet, and a closed or diverted hot flow path. In a general aspect of the valve, a wax filled actuator is coupled to a valve sleeve to move the sleeve from an open position in which radial flow openings in the sleeve communicate with a portion of the valve chamber to a closed position in which the radial flow openings are closed by a smaller diameter portion of the valve chamber that closely surrounds the sleeve. A flow-through end cap closes the larger diameter end of the valve chamber and provides an axially aligned fixed stop for the actuator piston. The actuator piston remains stationary while the actuator body and coupled valve sleeve float together between the cold (open) and hot (closed or diverted) positions within the valve body.

In a three-way valve, a diverter port communicates with the sleeve radial flow openings when the sleeve is in the closed position, resulting in a diverted fluid flow path. In a two-way valve, the closed position shuts off axial flow through the valve.

A thermally actuated valve exemplary of aspects of the present invention provides an axial flow path through the valve chamber by equipping one end of the valve housing with an end cap that both allows fluid flow and provides a hard stop for the piston of a temperature sensitive actuator. The valve housing defines an axially extending valve chamber in the form of a stepped bore extending between an inlet and an outlet. A smaller diameter portion of the stepped bore adjacent the inlet defines a sleeve chamber. A cylindrical valve sleeve with radial fluid flow openings is coupled to a thermally responsive actuator to form a valve member assembly. A return spring is compressed between an internal rim of the sleeve and the inlet end of the valve housing to bias the valve member assembly toward an open position. An open position corresponds to a sleeve position in which the radial fluid flow openings communicate with the larger diameter portion of the stepped bore adjacent the outlet, allowing fluid flow radially through the openings and axially through the end cap to the outlet. Heating the actuator through its activation temperature range causes the piston to extend from the actuator body against the hard stop and move the valve sleeve into the sleeve chamber against the bias of a return spring to a closed position. A closed position of the thermally actuated valve corresponds to a sleeve position in which the radial fluid flow openings are closed by the inside surface of the sleeve chamber and fluid flow toward the outlet is shut off.

One aspect of the invention relates to a spring-loaded coupling of the valve sleeve directly to the actuator. The sleeve is coupled to the actuator by a stiff relief spring. The spring-coupled sleeve and actuator body move together (float) under normal conditions. The relief spring compresses to accommodate excess actuator piston travel in over-temperature conditions, preventing possible damage to the valve.

A further aspect of the present invention relates to the flexibility provided by the unique structure of the thermal flow control valve. The basic valve components may be configured as a two-way thermally responsive shut-off valve, a thermally responsive three-way valve or as a temperature-responsive mixing valve. Each of the embodiments has an axial flow path between an inlet and an outlet, allowing an "in line" installation.

The flow-through end cap rotates freely relative to the valve body to improve ease of installation and removal of the valve.

DETAILED DESCRIPTION OF THE PREFERRED EMBODIMENT

Figure 1:
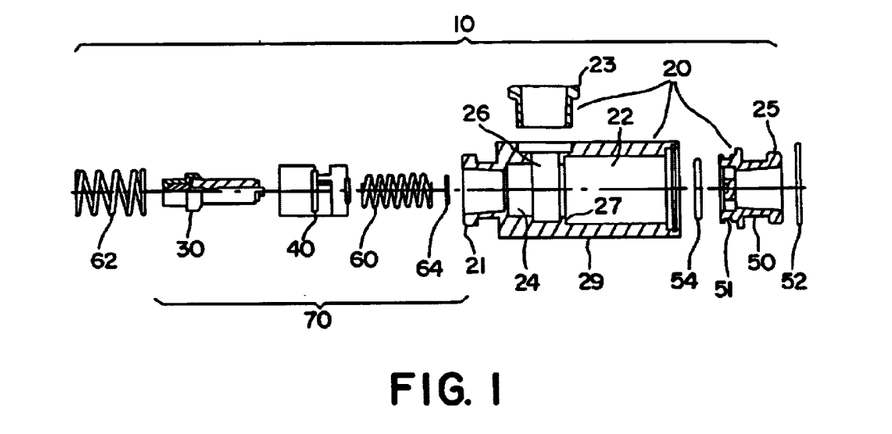
FIG. 1 is partially sectional, pre-assembly exploded view of a three way valve.
Figure 2:
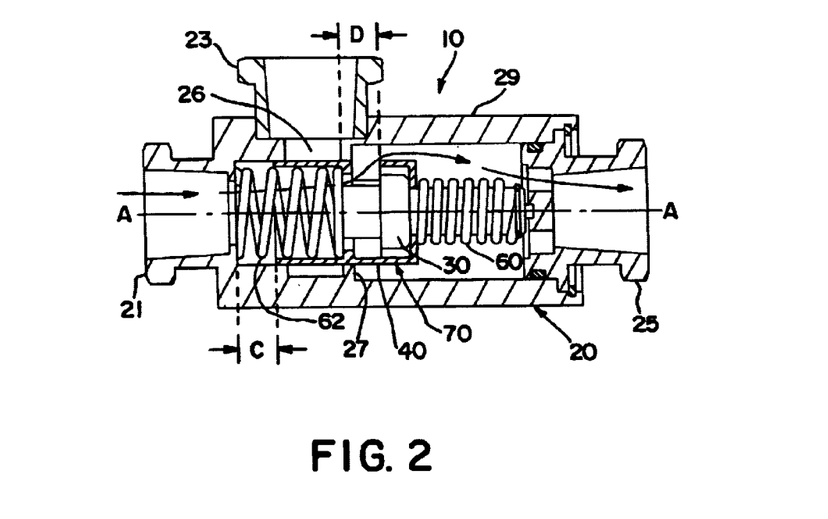
FIG. 2 is a sectional assembly view of the three way valve of FIG. 1 in the open position.

Exemplary embodiments of a thermal flow control valve 10, 10a (hereinafter "valve") are illustrated in FIGS. 1 through 10. FIGS. 1 and 2 are a partially sectional pre-assembly exploded view and a sectional assembly view of a three way valve 10, respectively, showing a thermally activated valve member assembly 70, a variable temperature inlet 21, a cold outlet 25 and a hot outlet 23. The valve member assembly 70 responds to changes in the temperature of fluid entering the inlet 21 to move a valve sleeve 40 between a "cold" or "flow through" position (shown in FIG. 2) to a "hot" or a "diverted flow" position (shown in FIG. 2A). FIG. 1 is a pre-assembly exploded view of the valve 20. The primary components of the valve are a valve housing 20, the valve member assembly 70 and a return spring 62 for biasing the valve member assembly toward the "cold" or "flow through" position illustrated in FIG. 2.

The housing 20 is made up of a valve body 29, a diverter outlet 23 and an end cap 50 that includes the cold outlet 25. In the illustrated embodiments, the valve housing components are machined from 2024 aluminum, although other materials are compatible with the disclosed structures. The diverter body 29 defines a longitudinal cavity extending between the inlet 21 and the cold outlet 25. The cavity is formed from two cylindrical coaxial bores. A first bore defines a sleeve chamber 24 coaxial with and adjacent to the inlet 21. A second bore of larger diameter defines an actuator chamber 22 coaxial with and adjacent to the cold outlet 25. The actuator chamber 22 ends at a radially inwardly projecting shoulder 27. A diverter port 26 communicates with the sleeve chamber 24. The inlet end of the valve body is machined to provide an internal, annular spring seat for the return spring 62 and an external coupling for connecting the valve 10 to a fluid flow system. The diverter outlet 23 is formed as a separate part and welded to the valve body 29. Alternatively, the diverter outlet 23 may be formed integrally with the valve body 29 by casting or machining. The couplings on inlet 21 and outlets 23, 25 are tapered pipe threads (NPT), but other coupling formats are compatible with the present invention.

Figure 8:
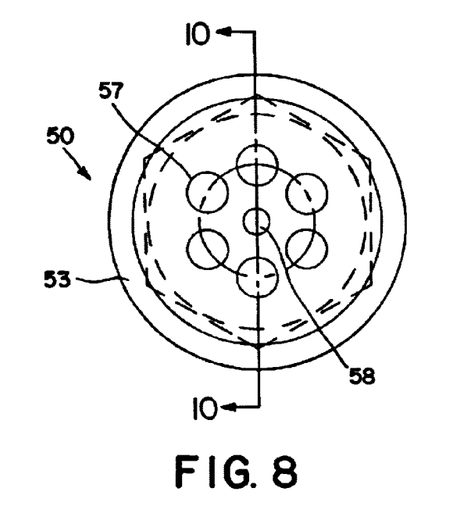
FIG. 8 is a view of the end cap from the inside with external features shown in phantom.
Figure 9:
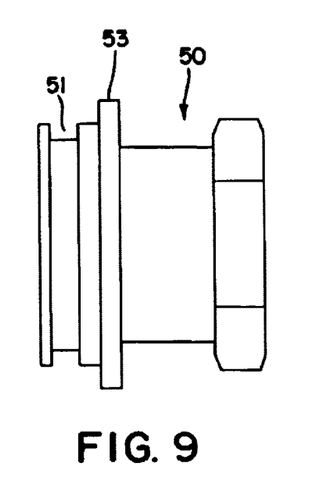
FIG. 9 is an exterior side view of the end cap of FIG. 8.
Figure 10:
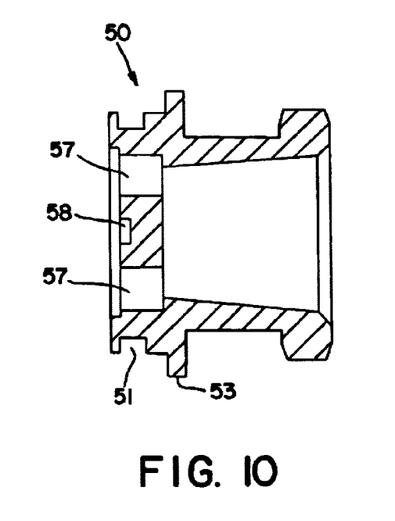
FIG. 10 is a sectional view of the end cap of FIG. 8 taken along line 10—10 thereof.

The cold outlet 25 is part of an end cap 50 configured to close the open end of the actuator chamber 22. The end cap is best illustrated in FIGS. 8–10. The end cap 50 defines an outward-facing groove 51 for reception of an O-ring 54 to seal a received portion of the end cap outwardly against the valve body 29. A radially outward-projecting flange 53 is retained against the end of the valve body 29 by a retaining clip 52. The rotationally symmetrical configuration of the received portions of the end cap 50 allow the end cap to rotate relative to the valve body 29 while remaining sealed and coupled to the valve body. This arrangement improves ease of installation and removal of the valve 10. The end cap 50 also defines flow passages 57 surrounding an axially aligned actuator stop 58. In the illustrated end cap 50, spokes of cap material between the flow passages 57 rigidly support the actuator stop 58 relative to the remaining parts of the valve 10 when the end cap is installed to the valve body 29. The configuration of the end cap 50 permits an axial flow path through the valve body 29.

Figure 3:
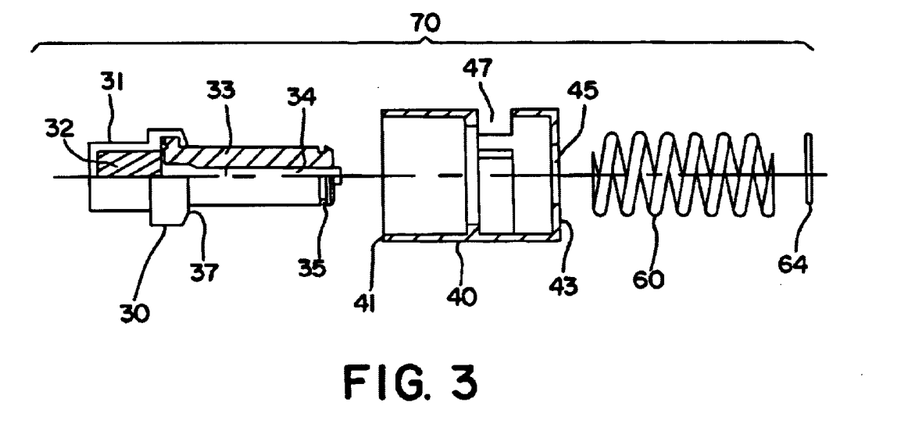
FIG. 3 is an enlarged portion of the pre-assembly exploded view of FIG. 1 illustrating the component of the valve member assembly.
Figure 4:
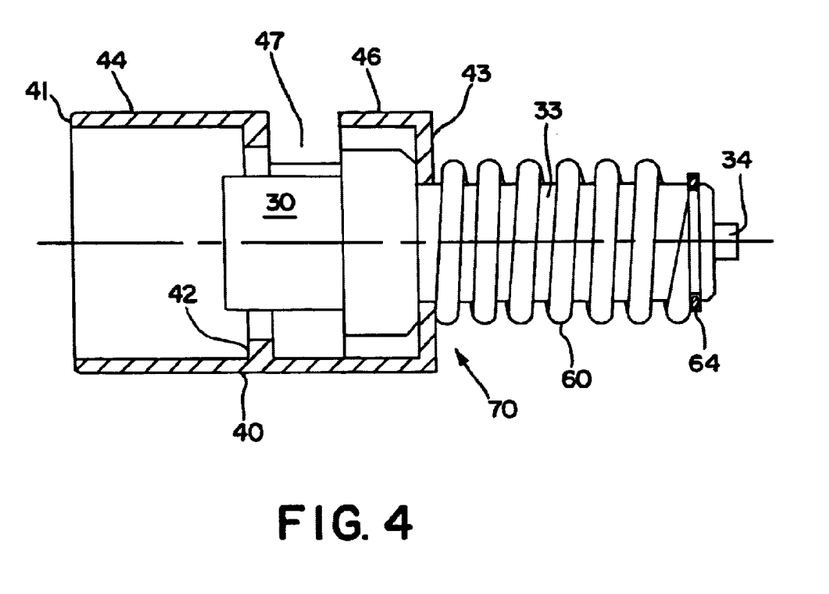
FIG. 4 is an enlarged assembly view of the valve member assembly of FIG. 3 with the sleeve and retainer shown in section.

The valve member assembly 70 is arranged within the valve chamber. An exemplary valve member assembly 70 is illustrated in FIGS. 3 and 4 and includes an actuator 30, a sleeve 40, a relief spring 60 and a retaining clip 64. The illustrated actuator 30 is of the wax-filled type well known in the art. An actuator body 31 is filled with a hydrocarbon wax 32 formulated to change from solid to liquid or from liquid to solid over a pre-determined temperature range. As the wax 32 changes state from solid to liquid, its volume increases. The increase in volume produces outward movement of a piston 34 in an axially extending piston guide 33 clamped to the actuator body 31 at a radially projecting shoulder 37. Motion is transmitted from the wax 32 to the piston 34 through a rubber plug situated in the neck of the piston guide 33. This type of actuator 30 produces axial outward movement of the piston 34 relative to the actuator body 31, guide 33 and shoulder 37 in response to an increase in temperature through the pre-determined range and permits a corresponding inward axial movement of the piston 34 as the temperature falls through the pre-determined temperature range. As is typical in the art, inward movement (return) of the piston 34 is assisted by a return spring 62. The wax may be formulated to produce solid to liquid transition over as small as a 10° change in temperature. The wax formulation also allows selection of the transition temperature over a range of 30° F. to 300° F.

In all the illustrated embodiments 10, 10a, 10b, the actuator 30 is arranged so that the free end of the piston 34 abuts an actuator stop 58 and remains stationary relative to the valve housing 20. Outward movement (actuation) of the piston 34 relative to the actuator body 31/guide 33 produces axial movement of the actuator body 31/guide 33 and sleeve 40 within the valve body 29 toward the closed position illustrated in FIGS. 2A, 2B and 12. Inward movement (return) of the piston 34 relative into the actuator body 31/guide 33 produces axial movement of the actuator body 31/guide 33 and sleeve 40 within the valve body 29 toward the open position illustrated in FIGS. 2, 2C and 11.

Figure 2A:
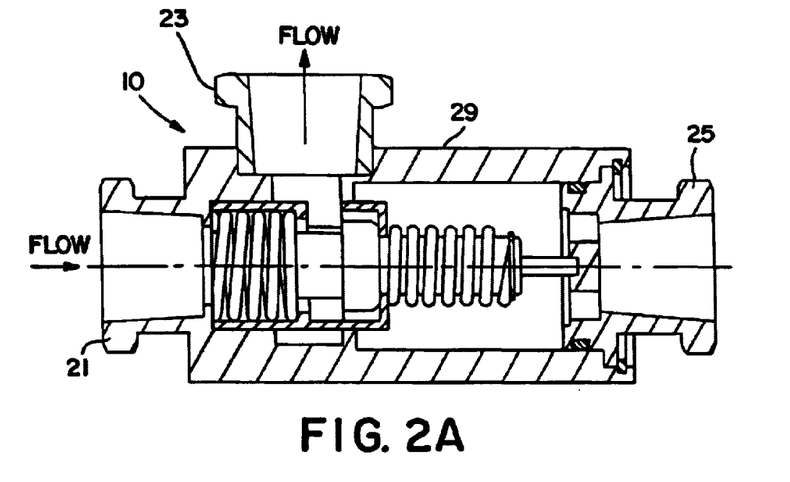
FIG. 2A is a sectional assembly view of the three way valve of FIG. 1 in the closed position.

As best seen in FIG. 4, the sleeve 40 is coupled to the actuator 30 by a relief spring 60. The relief spring 60 is compressed between the outlet end 43 of the sleeve and the retaining clip 64. The relief spring 60 biases the sleeve against the outwardly projecting shoulder 37 of the actuator 30. In the illustrated embodiment, the relief spring 60 is a cylindrical coil compression spring of corrosion resistant steel with a spring rate of approximately 56 lbs/in in its installed configuration. This relatively stiff spring maintains the sleeve 40 in contact with the actuator shoulder 37 over the range of motion, or "stroke" of the sleeve 40. When the inlet end 41 of the sleeve abuts the annular return spring seat in the valve body 29 as shown in FIG. 2A, further increases in temperature and the consequent outward movement of the piston 34 are accommodated by compression of the relief spring 60 and separation of the shoulder 37 from the outlet end 43 of the sleeve 40. Providing relief for piston travel in over-temperature situations is important because of the high axial forces developed by wax filed actuators. Without relief, the actuator could damage the sleeve or crack the valve body 29 or end cap 50.

Figure 5:
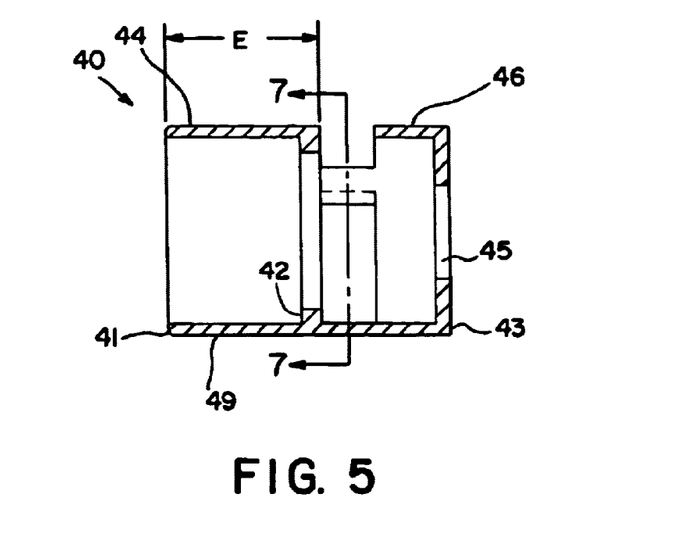
FIG. 5 is an isolated sectional view of the sleeve.
Figure 6:
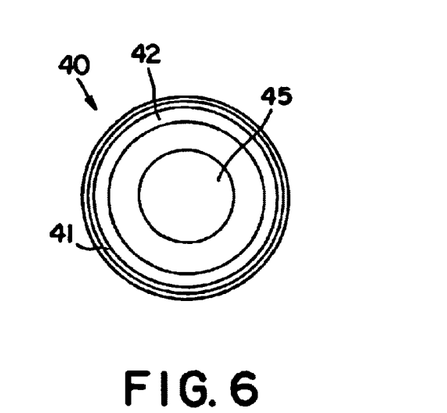
FIG. 6 is a left end view of the sleeve of FIG. 5.
Figure 7:
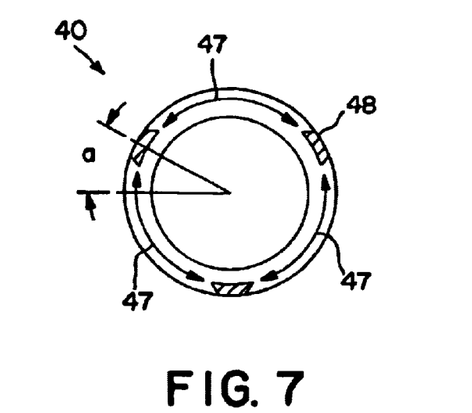
FIG. 7 is a sectional view of the sleeve of FIG. 5, taken along line 7—7 thereof.

As shown in FIGS. 5–7, the sleeve 40 has an open-ended cylindrical cup shape defining an interior space. An inward projecting rib or rim 42 provides a spring seat for the return spring 62. The sleeve 40 is open at an inlet end 41 and narrows to define a guide aperture 45 through the axially opposed outlet end 43. The outside surface 49 of the sleeve is axially separated into two valve surfaces 44, 46 by three equiangularly arranged radial openings 47. The radial openings 47 are elongated rectangular slots of equal length separated from each other by posts 48 of sleeve material. The valve surfaces 44, 46 and the radial openings 47 of the sleeve interact with the inside surface of the sleeve chamber 24 and the valve chamber shoulder 27 to regulate the flow of fluid through the valve 10. The illustrated sleeve 40 is machined from 360 AMS brass. Precise tolerances are maintained for the diameter and circularity of the outside surface 49.

Assembly of the valve is as follows:

a return spring is inserted through the outlet end of the valve body 29 into the sleeve chamber 24;

the valve member assembly 70 is inserted into the valve housing 29 from the outlet end such that the open inlet end 41 of the valve sleeve 40 surrounds the return spring 62 and the return spring abuts the inwardly projecting rib 42 defined on the inside surface of the valve sleeve 40;

the end cap 50 is inserted into the outlet end of the valve body 29 with the piston 34 centered in the actuator stop 58; and the end cap 50 is then retained in place by the retaining clip 52.

In the assembled valve, both the return spring 62 and the relief spring 60 are partially compressed, or pre-loaded.

FIGS. 2 and 2A are sectional views through an assembled valve 10. The actuator 30 is primarily located in the actuator chamber 22 with the piston 34 abutting the end cap 50 at the actuator stop 58. The tip of the piston 34 is maintained in axial alignment by seating in the blind bore defined by the actuator stop 58. The valve sleeve 40 is received into the sleeve chamber 24 to surround the return spring 62. Very small tolerances (0.0005 inch; five ten thousandths of an inch) are maintained between the outside surface 49 of the sleeve and the inside surface of the sleeve chamber 24. One result of this tight fit is that fluid cannot pass between the sleeve 40 and the inside surface of the sleeve chamber 22. This is known in the art as a "no leak" valve. A further effect of the tight fit is that axial movement of the sleeve in the sleeve chamber may be stiff. The actuator is selected to have power sufficient to overcome this stiffness in the actuation direction, e.g., during sleeve/actuator movement toward the closed position illustrated in FIG. 2A. The return spring 62 is a cylindrical coil spring of corrosion resistant steel with a spring force and spring rate selected to overcome this stiffness in the return direction, e.g., toward the open position illustrated in FIG. 2. The illustrated return spring 62 has a spring rate of approximately 38 lbs/in in its installed configuration. It will be noted that the return spring 62 bears against the sleeve 40 which is in turn coupled to the actuator 30 by the relief spring 60. Because the relief spring 60 is significantly stronger than the return spring. 62, the sleeve 40 and actuator move together within the valve 10, with the exception of the over-temperature condition described above. The spring rates discussed with regard to the illustrated embodiments are exemplary and are not intended to limit the invention. Those of skill in the are will understand that the relevant spring rates will vary depending on design parameters for a particular valve and the end use for the valve.

All fluid flow through the valve 10 is through the sleeve radial openings 47. It will be noted that the radial openings 47 defined by the sleeve 40 are unobstructed by either the return spring 62 or the relief spring 60. The return spring 62 seats against the internal rib 42 of the sleeve and is held away from the sleeve openings 47. In the "cold" or "open" position shown in FIG. 2, the radial openings 47 of the sleeve 40 are in communication with the actuator chamber 22 and fluid is allowed to flow radially outwardly and axially through the actuator chamber and end cap 50 to the cold outlet 25 (as shown by the arrows). Valve surface 44 covers the diverter port when the valve is in the cold position of FIG. 2. In the "hot" or "closed" position shown in FIG. 2A, the radial openings 47 are positioned in the sleeve chamber 24 and in communication with the diverter port 26. In the closed position, valve surface 46 overlaps the inside surface of the sleeve chamber 24 to block axial flow of fluid through the valve 10. While the sleeve is in transition between the cold and hot positions, the radial openings 47 sleeve will be in communication with both the actuator chamber 22 and the diverter port 26.

Figure 11:
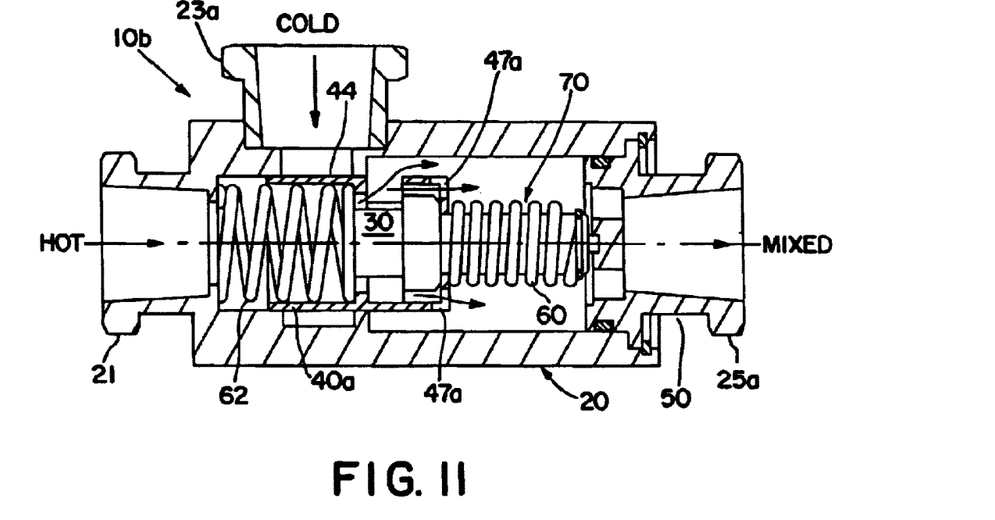
FIG. 11 is a sectional assembly view of a mixing valve exemplary of aspects of the present invention in a cold position.
Figure 12:
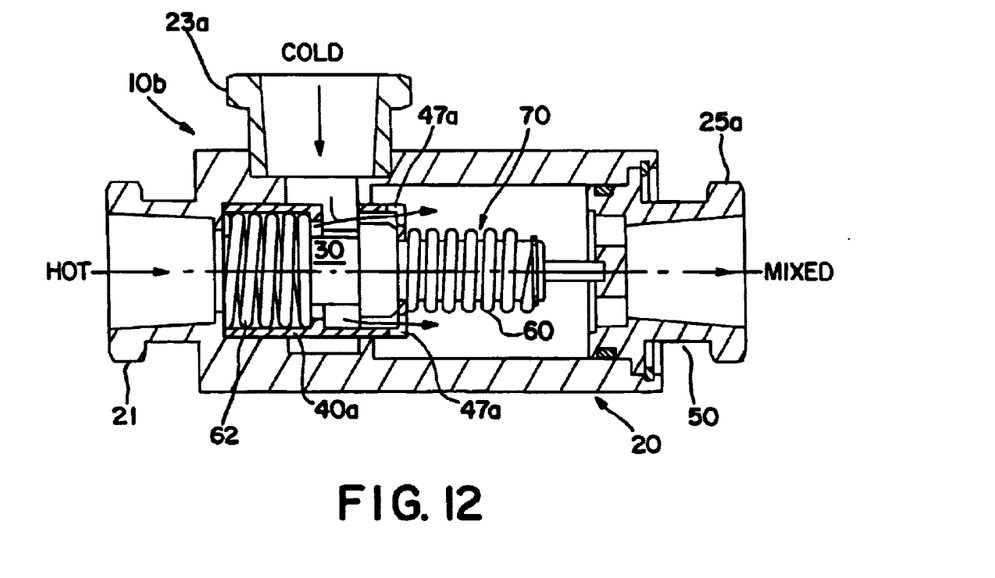
FIG. 12 is a sectional assembly view of the mixing valve of FIG. 11 in a hot position.

A valve according to aspects of the present invention may be configured in a mixing valve configuration as illustrated in FIGS. 11 and 12. The valve housing 20, end cap 50, actuator 30, relief spring and bias spring 62 are identical in all respects to corresponding components of the valve 10 shown in FIGS. 2 and 2A. The mixing valve 10b is configured for installation in a fluid system that feeds a hot fluid to inlet 21 and cold fluid to inlet 23a. The sleeve 40a is similar to sleeve 40 discussed above with the exception of additional fluid openings 47a provided in the sleeve outlet end 43. These openings 47a ensure fluid flow through the valve 10b in all positions of the sleeve 40a. FIG. 11 shows the valve member assembly 70 in a position corresponding to a fluid temperature entering the hot inlet 21 below the transition temperature of the actuator 30. In this position, fluid flows from the hot inlet 21, through the valve sleeve 40a and openings 47 and 47a to the mixed outlet 25. Below the actuator transition temperature, the valve adds no cold fluid to fluid flowing through the valve because the sleeve valve surface 44 covers the cold inlet.

FIG. 12 illustrates the mixing valve member assembly 70 in a position corresponding to a fluid temperature above the actuator transition temperature. In this position, the valve sleeve 40a allows maximum cold fluid to enter through openings 47, mix with the hot fluid and flow through openings 47a. The mixing valve 10b works best in applications where the temperatures of the hot and cold fluids fluctuate within a small range. The actuator transition temperature is selected to provide the desired mixed fluid temperature at the outlet 25.

The valve chamber defined within the valve body 29 may be described as a stepped bore. The larger diameter of the actuator chamber 22 permits radial and axial flow of fluid when the valve is in the cold position illustrated in FIG. 2. The inward projecting shoulder 27 of the valve chamber interacts with the sleeve to provide a control edge that covers the sleeve radial openings 47 as the sleeve 40 moves toward the hot position illustrated in FIG. 2A.

The actuator 30 and coupled sleeve 40 move together over a stroke of an axial length C as shown in FIG. 2. This stroke length C should be sufficient to close the radial openings 47 and provide for some overlap of valve surface 46 with the inside surface of the sleeve chamber 24 (illustrated at D in FIG. 2). The overlap improves the seal between the sleeve and the inside surface of the sleeve chamber. During valve actuation, the sleeve 40 is maintained in alignment with the sleeve chamber inside surface by the outside surface 49 of the sleeve and in particular by the three posts 48 of sleeve material connecting valve surface 44 to valve surface 46. Valve surface 44 needs an axial length E sufficient to cover the divert port 26.

Figure 2B:
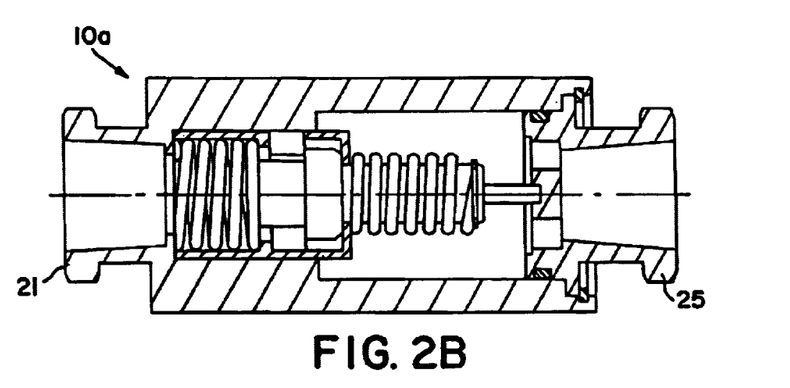
FIG. 2B is a sectional assembly view of a closed two way valve exemplary of aspects of the present invention.
Figure 2C:
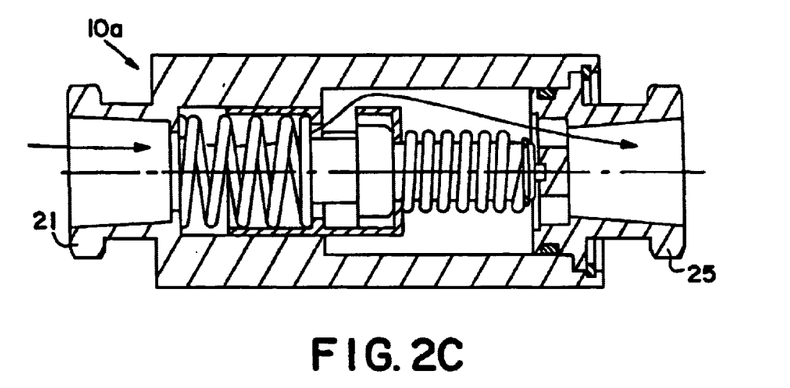
FIG. 2C is a sectional assembly view of the two way valve of FIG. 2B in the open position.

FIGS. 2B and 2C illustrate a two-way version of the thermal flow control valve 10a. The two-way embodiment of the thermal flow control valve is identical to the three-way valve 10 in all respects except that there is no diverter port 26 or diverter outlet 23. In this configuration, the valve 10a is a thermally activated on/off valve. The stepped bore valve chamber permits an axial flow pattern through the valve 10a as shown in FIG. 2C. FIG. 2B illustrates the two-way valve in the closed position.

The unique interaction of the valve sleeve outside surface with the inside surface of the valve chamber stepped bore, in combination with the flow-through end cap with actuator stop, permit the thermally actuated valve to have an axial flow path in the flow-through sleeve position. The valve inlet and cold outlet are axially aligned, simplifying Installation of the valve 10, 10a. Alternative embodiments of the valve may be configured as a temperature-controlled on/off valve 10a as shown in FIGS. 2B and 2C, a diverter valve 10 as illustrated in FIGS. 2 and 2A, or a mixing valve.

While exemplary embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A valve for controlling fluid flow in response to changes is fluid temperature, said valve comprising:
    a valve housing defining an interior cavity extending between an inlet and an axially aligned outlet, said interior cavity including an actuator chamber coaxial and in communication with said outlet and a sleeve chamber coaxial and in communication with said inlet, said valve housing also defining an diverter port communicating with said sleeve chamber;
    a thermal actuator having a body including a radially projecting shoulder and an axially extending guide defining a piston guide bore, said actuator including a piston received in said guide bore, said actuator responsive to changes in temperature to produce relative axial movement between the piston and said body, said actuator arranged in said actuator chamber with said piston supported against axial movement by said valve housing whereby thermal actuation produces axial movement of said actuator body relative to said valve housing;
    a cup-shaped sleeve defining an interior space open at an inlet end and radially closed against said projecting shoulder at an outlet end, said sleeve having a cylindrical outside surface closely received in said sleeve chamber, said outside surface defining a radial opening intermediate the sleeve inlet and outlet ends;
    wherein said actuator moves said sleeve axially between a flow through position and a divert position, said flow through position corresponding to a sleeve axial location in which said radial opening communicates between said sleeve interior space and said actuator chamber while said sleeve outside surface covers said diverter port, said divert position corresponding to a sleeve axial location in which said radial opening communicates between said sleeve interior space and said diverter port while said sleeve outlet end and coupled actuator block fluid flow toward said valve outlet.

2. The valve of claim 1, wherein said actuator chamber is a cylindrical bore having a first diameter and said sleeve chamber is a cylindrical bore having a second diameter smaller than said first diameter.

3. The valve of claim 1, wherein said radial opening comprises three substantially identical equiangularly spaced radial openings.

4. The valve of claim 1, wherein said radial opening comprises three rectangular slots equidistantly arranged in a band around said outside surface, each said slot separated from an adjacent slot by a post of sleeve material.

5. The valve of claim 1, wherein said valve housing comprises an end cap defining said outlet, said end cap including a fixed abutment for supporting said piston against axial movement and a flow passage permitting fluid flow through said outlet.

6. The valve of claim 5, wherein said fixed abutment is aligned along an axis of said actuator chamber and said flow passage comprises a plurality of flow passages arranged radially outwardly of said fixed abutment.

7. The valve of claim 1, wherein said sleeve is coupled to said actuator body by a spring surrounding said guide and compressed between a retainer secured to said guide and the outlet end of said sleeve.

8. The valve of claim 1, comprising a return spring compressed between an inlet end of said sleeve chamber and a spring stop projecting radially inwardly from said sleeve, said return spring acting on said sleeve to bias said sleeve and actuator body toward said flow through position.

9. The valve of claim 1, wherein said sleeve outside surface is radially spaced from an inside surface of said actuator chamber, permitting fluid flow radially through said radial openings and axially toward said outlet when said radial opening is in communication with said actuator chamber.

10. A thermally actuated valve member comprising:
    an actuator having a body including a radially projecting shoulder and an axially extending guide defining a piston guide bore through a piston end of said guide, said actuator including a piston received in said guide bore, said actuator responsive to changes in temperature to produce axial movement of the piston relative to said body;
    a cup-shaped sleeve defining an interior space open at an inlet end and radially converging to define a guide aperture at an axially opposed outlet end, said sleeve having a cylindrical outside surface with a plurality of radial openings, said sleeve fixed to said actuator with said guide received through said guide aperture and an inside surface of said sleeve outlet end abutting said shoulder to close said guide opening,
    wherein said sleeve is slidable along said guide toward said piston end.

11. The valve member of claim 10, wherein said sleeve is biased against said shoulder by a spring compressed between a retainer secured to said guide and the outlet end of said sleeve.

12. The valve member of claim 10, wherein said plurality of radial openings comprise three rectangular slots equidistantly arranged in a band around said outside surface, each slot separated from an adjacent slot by a post of sleeve material.

13. The valve member of claim 10, wherein said sleeve includes a radially inwardly projecting spring stop axially intermediate said inlet end and said plurality of radial openings.

14. A valve for controlling fluid flow in response to fluid temperature comprising
  a valve housing defining a stepped bore extending between an inlet and an outlet, said stepped bore having a first portion adjacent said inlet with an inside surface at a first diameter and a second portion adjacent said outlet with an inside surface at a second diameter greater than said first diameter;
  a cup-shaped valve sleeve with a cylindrical outside surface extending from an open inlet end to an outlet end defining an actuator aperture, said valve sleeve defining a radial opening through said outside surface;
  a thermally responsive actuator received in said actuator aperture and coupled to said valve sleeve, said actuator responsive to an increase in temperature at said inlet to axially extend a piston slidably supported in said actuator,
  wherein said piston abuts said valve housing adjacent said outlet such that axial extension of said piston from said actuator moves said actuator and valve sleeve from an open position where said radial opening communicates with said valve chamber second portion to permit fluid flow axially through said valve sleeve, radially through said radial opening and axially through said outlet toward a closed position where said radial opening is closed by said valve chamber first portion inside surface and fluid flow from said inlet toward said outlet is blocked by said valve sleeve and received actuator.

15. The valve of claim 14, wherein said actuator comprises an actuator body with a radial shoulder and a guide slidably supporting said piston, said valve sleeve coupled to said actuator by a spring surrounding said guide and compressed between said valve sleeve outlet end and a retainer secured to said guide.

16. The valve of claim 14, wherein said valve sleeve and actuator are biased toward said open position by a return spring compressed between said valve housing adjacent said inlet and said valve sleeve.

17. The valve of claim 14, wherein said valve sleeve includes a radially inwardly projecting spring stop axially intermediate the valve sleeve inlet end and said radial opening, said valve sleeve and actuator being biased toward said open position by a return spring compressed between said valve housing adjacent said inlet and said spring stop.

18. The valve of claim 15, wherein axial extension of said piston from said valve sleeve brings said valve sleeve into contact with said valve housing adjacent said inlet stopping further axial movement of said valve sleeve, further compression of said spring permitting axial separation of said actuator body from said valve sleeve to accommodate further axial extension of said piston without damaging said valve sleeve or said valve housing.

19. The valve of claim 14, wherein said valve housing comprises an end cap defining said outlet, said end cap including a fixed abutment point for supporting said piston against axial movement.

20. The valve of claim 19, wherein said fixed abutment is aligned along an axis of said stepped bore and said end cap defines a plurality of flow passages radially surrounding said fixed abutment.

\* \* \* \* \*